United States Patent Office 3,499,932
Patented Mar. 10, 1970

3,499,932
HYDROFORMYLATION OF POLYCYCLIC DIOLEFINS
Roy L. Pruett, Charleston, W. Va., and Kenneth O. Groves, Midland, Mich., assignors to Union Carbide Corporation, a corporation of New York
No Drawing. Filed June 15, 1967, Ser. No. 646,182
Int. Cl. C07c 45/02, 47/38
U.S. Cl. 260—598
7 Claims

ABSTRACT OF THE DISCLOSURE

Process involving the dihydroformylation of well-defined polycyclic non-conjugated diolefins which contain two alicyclic ethylenic bonds using a complex catalyst consisting essentially of rhodium in complex combination with carbon monoxide and a triarylphosphine.

---

This invention relates to the preparation of oxygenated organic compounds by the reaction of a polycyclic non-conjugated diolefin with carbon monoxide and hydrogen in the presence of certain complex catalysts and under carefully controlled conditions described hereinafter.

Processes directed to the production of reaction mixtures comprising substantial amounts of aldehydes and at times lesser amounts of alcohols by the reaction of olefinc compounds with carbon monoxide and hydrogen at elevated temperatures and pressures in the presence of certain catalysts are well-known in the art. The aldehydes and alcohols produced generally correspond to the compounds obtained by the addition of a carbonyl or carbinol group to an olefinically unsaturated carbon atom in the starting material with simultaneous saturation of the olefin bond. Isomerization of the olefin bond may take place to varying degrees under certain conditions with the consequent variation in the products obtained. Such processes are generally known in industry under varying names such as the Oxo process or reaction, oxonation, and/or hydroformylation. A disadvantage of prior art hydroformylation processes is their dependence upon the use of catalysts such as cobalt octacarbonyl which require exceedingly high operative pressures and relatively high temperatures to maintain such catalysts in their stable form.

It has now been discovered quite unexpectedly, indeed, that a well-defined class of polycyclic non-conjugated diolefinic compounds can be conveniently reacted, in liquid phase, with carbon monoxide and hydrogen, at a moderately elevated temperature, in the presence of a rhodium-containing complex catalyst described hereinafter, to produce useful oxygenated products comprising dialdehydes which have two more carbon atoms than the diolefinic starting material. In one embodiment, the practice of the novel process affords an excellent route to dihydroformylate polycyclic non-conjugated diolefins, preferably at a temperature not exceeding 95° C. when employing polycyclic non-conjugated diolefins which possess two strained-ring carbon-to-carbon ethylenic or olefinic bonds of approximately equal reactivity, to thus produce polycyclic dialdehydic products in high yields with a minimum of side products. The dialdehydic products, as indicated above, are characterized in that they have two more carbon atoms (in the form of two formyl groups) than the diolefinic reactant.

The polycyclic non-conjugated diolefinic compounds which are suitable in the novel process are characterized in that (1) they posses two alicyclic carbon-to-carbon ethylenic bonds, i.e., a >C=C< group which forms part of a cycloaliphatic nucleus, (2) they are composed solely of carbon and hydrogen atoms, (3) they posses from 2 to 5 cycloaliphatic nuclei having from 4 to 7 carbon atoms in each nucleus, and (4) they are free from acetylenic (—C≡C—) and benzenoid (or aromatic) unsaturations. Those polycyclic diolefins which contain two strained-ring carbon-to-carbon ethylenic bonds of approximately equal reactivity are particularly preferred.

Illustrative cyclic olefinic reactants include dicyclopentadiene,
bicyclo[2.2.1]hepta-2,5-diene,
tricyclo[6.2.1.0$^{2,7}$]undeca-4,9-diene,
tetracyclo[6.2.1.1$^{3,6}$.0$^{2,7}$]dodeca-4,9-diene,
pentacyclo[8.2.1.1$^{4,7}$.0$^{2,9}$.0$^{3,8}$]tetradeca-5,11-diene,
pentacyclo[6.6.1.1$^{3,6}$.0$^{2,7}$.0$^{9,14}$]hexadeca-2,11-diene,
methyltricyclo[5.2.1.0$^{2,6}$]deca-3,8-diene,
2-methylbicyclo[2.2.1]hepta-2,5-diene,
2-ethylbicyclo[2.2.1]hepta-2,5-diene,
2-isopropylbicyclo[2.2.1]hepta-2,5-diene,
2-n-butylbicyclo[2.2.1]hepta-2,5-diene,
4-ethyltricyclo[6.2.1.0$^{2,7}$]undec-4,9-diene,
3-methyltricyclo[6.2.1.0$^{2,7}$]undec-4,9-diene,
methyltetracyclo[6.2.1.1$^{3,6}$.0$^{2,7}$]dodeca-4,9-diene,
methylpentacyclo[6.6.1.1$^{3,6}$.0$^{2,7}$.0$^{9,14}$]hexadeca-2,11-diene, and the like.

The catalysts which are contemplated comprise rhodium in complex combination with carbon monoxide and triphenylphosphine wherein the phosphorus atom is trivalent and has one available or unshared pair of electrons. In its active form, the suitable catalysts will contain the rhodium component in a reduced valence state. This will normally be a zero valence state and may suitably be even lower, such as a minus one (−1) valence state.

As used throughout this specification and claims, the term "complex" means a coordination compound formed by the union of one or more electronically rich molecules or atoms capable of independent existence with one or more electronically poor molecules or atoms, each of which is also capable of independent existence.

It has been observed that mixed triorgano substituted phosphorus-containing ligands such as mixed aryl aryloxy and aryl alkoxy phosphorus compounds, e.g., $\phi_2 P(O\phi)$, $\phi P(OCH_3)_2$, etc., when $\phi$ represents the phenyl radical, gave to various degrees quite unsatisfactory results.

The triphenylphosphine-rhodium-carbonyl complexes can be represented by the empirical formula:

$$(\phi_3 P)_a Rh(CO)_b$$

wherein $\phi$ is phenyl; wherein $a$ and $b$ are integers each having a value of at least 1; and wherein the sum of $a$ plus $b$ represents 4. It is to be understood that the suitable catalysts identified by the above empirical formula may comprise two or more of the $(\phi_3P)_aRh(CO)_b$ groups, e.g., as dimer or trimer.

The novel hydroformylation is effected in the presence of a catalytically significant quantity of the complex catalyst. In general, a catalyst concentration in the range of from about 0.0001 and lower, to about 3, and higher, weight percent, calculated on the weight of rhodium metal to the weight of olefin feed employed is suitable. A catalyst concentration in the range of from about 0.001 to about 1.5 weight percent of rhodium metal (based on the weight of the olefin feed) is preferred. It is thus apparent that the concentration of the complex catalyst can vary over a fairly wide range.

The concentration of the ligand to rhodium metal, on the other hand, is somewhat critical. Though about one equivalent (and even less than one equivalent) of ligand per mole of rhodium gave operable results, a ratio of greater than about one and preferably about 2 equivalents and still more preferably about 6 equivalents and upwards to about 30 equivalents, and higher, of ligand per mole of rhodium resulted in a high performance hydroformylation process, that is, high yields of aldehydic product as well as rapid reaction rates. Moreover, one can employ a potential or active catalyst source, whether preformed prior to introduction into the hydroformylation zone or prepared in situ during the hydroformylation reaction, and still obtain the benefit of the foregoing advantages.

By reference to the empirical formula supra, it is readily apparent that various rhodium complexes can be prepared depending upon the concentration of the triphenylphosphine ligand employed, that is, one, two, or three equivalents of triphenylphosphine ligand per mole of rhodium. The use of the triphenylphosphine ligand in amounts greater than about 3 equivalents per mole of rhodium results in an admixture of highly active complex catalyst and ligand. Moreover, the novel hydroformylation process can be effected in the presence of a large excess of triphenylphosphine ligand which excess can be considered as an inert diluent in the reaction mixture. As a practical matter, however, the novel process is most effective when using a potential or active catalyst species which involves at least about 6 equivalents of triphenylphosphine per mole of rhodium. Of course, consideration must also be given to a correlation of factors such as operative temperature and pressure, the ratio of the components comprising the synthesis gas, etc., in order to attain optimum results.

The complex catalyst has the ability to remain stable and exhibit high activity for extended periods of time at relatively low pressures and low temperatures. Consequently, the novel process can be carried out at pressures far below 20 atmospheres to as low as one atmosphere or less. Under comparable conditions, prior art catalysts such as cobalt octacarbonyl often decompose and become inactive. The invention, however, is not limited to such lower pressures and pressures from about atmospheric to about 300 atmospheres, and higher, are contemplated. However, optimization of the process generally requires superatmospheric pressures, that is, greater than about one atmosphere and upwards to about 250 atmospheres, and higher. Pressures of from about 10 atmospheres to about 200 atmospheres are preferred.

A truly notable advantage which results in the practice of the invention is that the hydroformylation reaction can be effected at moderately elevated temperatures. Thus, temperatures below 95° C. and as low as 65° C., and even lower, are used to accomplish the dihydroformylation of the polycyclic non-conjugated diolefins which possess two strained-ring carbon-to-carbon ethylenic bonds of approximately equal reactivity, e.g., bicyclo[2.2.1]hepta-2,5 - diene, tetracyclo[6.2.1.1$^{3,6}$.0$^{2,7}$]dodeca - 4,9 - diene, pentacyclo[8.2.1.1$^{4,7}$.0$^{2,9}$.0$^{3,8}$]tetradeca-5,11-diene, and the like. However, it is to be understood that higher and lower reaction temperatures can be employed, e.g., from about 60° C., and lower, to 140° C.

The ratio of hydrogen to carbon monoxide employed in the hydroformylation reaction may vary over a wide range. Thus, the mole ratio of hydrogen to carbon monoxide can be less than one or greater than one, e.g., the ratio of hydrogen to carbon monoxide can be about 1:10 to about 10:1. Higher and lower ratios may also be employed. Desirable ratios of hydrogen to carbon monoxide are between about 1:3 to about 3:1.

As intimated previously, a significant variable which influences the residence period of the reaction and the yield of the aldehydic product is the concentration of the triphenylphosphine ligand, either in the complex catalyst per se or as an admixture of ligand and complex catalyst. Thus, depending on the concentration of triphenylphosphine to rhodium as well as other variables such as reaction temperature, olefin as choice, catalyst of choice, etc., the residence period can vary from about a couple of minutes to several hours in duration. As a practical matter the reaction is effected for a period of time which is sufficient to dihydroformylate the alicyclic ethylenic bonds in the diolefinic reactant.

Solvents are not required in the practice of the novel process. If desired, however, one can employ normally-liquid organic solvents which are inert or which do not interfere to any substantial degree with the desired hydroformylation reaction under the operative conditions employed. Illustrative of such solvents include the saturated hydrocarbons, such as the pentanes, naphtha, kerosene, mineral oil, cyclohexane, etc. as well as the aromatic hydrocarbons, ethers, ketones, and nitriles as illustrated by benzene, xylene, toluene, diethyl ether, acetophenone, cyclohexanone, benzonitrile, and the like.

The preparation of the catalysts employed in the novel hydroformylation reaction is well-documented in the literature. A suitable method is to combine the rhodium salt of an organic acid with triphenylphosphine ligand, in liquid phase. The valence state of rhodium may then be reduced by hydrogenating the solution prior to the use of the catalysts therein. It may also be accomplished simultaneously with the hydroformylation process by means of increased carbon monoxide pressure preferably without the presence of hydrogen. Alternatively, the catalysts may be prepared from a carbon monoxide complex of rhodium. For example, it is possible to start with dirhodium octacarbonyl, and by heating this substance with triphenylphosphine ligand, the ligand will replace one or more of the carbon monoxide molecules, thus producing the desired catalyst. This latter method is very suitable for regulating the number of carbon monoxide molecules and triphenylphosphine molecules present in the catalyst. Thus, by increasing the amount of triphenylphosphine added to the dirhodium octacarbonyl additional amounts of the carbon monoxide molecules can be replaced.

The following examples are illustrative.

EXAMPLES 1–10

In Examples 1–10, a three-liter rocking autoclave was used as the reaction vessel. In all examples, toluene was employed as the solvent. Unless indicated otherwise, the rhodium species was generally employed as 0.5 weight percent Rh on alumina or 5 weight percent Rh on carbon. After charging to the autoclave toluene, dienic reactant, rhodium source, ligand if any, and activated carbon if any, the autoclave was sealed and pressurized with carbon monoxide and hydrogen. The autoclave then was heated with rocking until reaction began, as evidenced by pressure drop and heat being evolved. The temperature was controlled at the lowest point consistent with a good rate of reaction. After cooling to room temperature, i.e., 20° to 22° C., the excess gases were vented and the autoclave opened. The contents were filtered to remove the catalyst and the liquid phase was distilled. The pertinent data are set out in Table I.

TABLE I

| Example | Diene | Grams | Grams of Toluene | Rh Source | Grams | Ligand | Grams |
|---|---|---|---|---|---|---|---|
| 1 | CDT[3] | 123 | 343 | 0.5% Rh/Al$_2$O$_3$ | 20 | $(\varphi O)_3 P$ | 0.6 |
| 2 | Cyclo[4] | 48 | 517 | 0.5% Rh/Al$_2$O$_3$ | 20 | $(\varphi O)_3 P$ | 0.6 |
| 3 | COD[5] | 108 | 343 | 0.5% Rh/Al$_2$O$_3$ | 20 | $(\varphi O)_3 P$ | 0.6 |
| 4 | BCH[6] | 100 | 433 | 0.5% Rh/Al$_2$O$_3$ | 20 | $\varphi_3 P$ | 1.8 |
| 5 | BCH[6] | 100 | 433 | 0.5% Rh/Al$_2$O$_3$ | 20 | $\varphi_2 P(O\varphi)$ | 1.6 |
| 6 | BCH[6] | 100 | 433 | 0.5% Rh/Al$_2$O$_3$ | 20 | $\varphi P(OCH_3)_2$ | 1.0 |
| 7 | Crot[7] | 35 | 433 | 5% Rh/C + 20 gms. of C | 2 | $(\varphi O)_3 P$ | 1.8 |
| 8 | Crot[7] | 35 | 433 | 5% Rh/C + 20 gms. of C | 2 | $(C_4H_9)_3 P$ | 1.8 |
| 9 | MVCP[8] | 88 | 433 | 5% Rh/C + 20 gms. of C | 2 | $(\varphi O)_3 P$ | 3.6 |
| 10 | BCH[6] | 100 | 433 | RhCl$_3$·3H$_2$O | 0.2 | None | 0 |

| | H$_2$ pressure | CO pressure | Reaction Temp., °C | Time,[1] min. | Grams of distillate | Grams of residue | Yield,[2] percent | Remarks |
|---|---|---|---|---|---|---|---|---|
| 1 | 1,800 | 600 | →120 | [a] 30 | | | | No reaction. |
| 2 | 2,100 | 700 | →120 | [a] 15 | | | | Do. |
| 3 | 2,100 | 700 | →110 | [a] 30 | (b) | 48.5 | | Distilled over wide range. |
| 4 | 1,600 | 800 | 80–83 | 45 | 142.5 | 9.5 | 87 | |
| 5 | 1,600 | 800 | →110 | [a] 10 | | | | Small amount of gas uptake; some polymeric product. |
| 6 | 1,600 | 800 | 80–82 | 75 | 89 | 62.5 | 54 | |
| 7 | 1,600 | 800 | →130 | [a] 15 | | | | No reaction. |
| 8 | 1,600 | 800 | →171 | [a] 15 | | | | Do. |
| 9 | 1,600 | 800 | →120 | [a] >60 | | | | Long slow experiment. |
| 10 | 1,600 | 800 | 151 | 15 | | | | No reaction except some polymer. |

[1] Time for 80% reaction.
[2] Yield of dialdehydic products.
[3] Cyclodeca-1,5,9-triene.
[4] Cyclopentadiene.
[5] Cycloocta-1,5-diene.
[6] Bicyclo[2.2.1]hepta-2,5-diene.
[7] Crotonaldehyde.
[8] 1-methylene-2-vinylcyclopentane.
[a] Temperature was increased usually by increments of about 10° C., then held at the increased temperature for approximately 5–10 minutes. Final temperature is indicated by arrow.
[b] Distillation of reaction products (139 grams) gave:

| Temp., °C. | P, mm. Hg | Distillate, grams |
|---|---|---|
| 28–47 | 0.35–0.75 | 10 |
| 47–51 | 0.35–0.40 | 34 |
| 51–78 | 0.40–0.50 | 23.5 |
| 78–105 | 0.50–1.0 | 15 |
| Residue | | 48.5 |

EXAMPLE 11

(A) In an analogous manner to Example 4 supra, when pentacyclo[8.2.1.1$^{4,7}$.0$^{2,9}$.0$^{3,8}$]tetradeca-5,11-diene (184 grams) is employed in lieu of bicyclo[2.2.1]hepta-2,5-diene and the reaction is effected at a temperature of about 90° C., there is obtained a mixture of isomeric dialdehydic products having two more carbon atoms than the starting diene, i.e., 5,11(12)-diformylpentacyclo[8.2.1.1$^{4,7}$.0$^{2,9}$.0$^{3,8}$]tetradecanes.

(B) In an analogous manner to Example 4 supra, when tetracyclo[6.2.1.1$^{3,6}$.0$^{2,7}$]dodeca-4,9-diene (100 grams) is employed in lieu of bicyclo[2.2.1]hepta-2,5-diene and the reaction is effected at about 90° C. for 10 minutes and at about 115° C. for additional 25 minutes, there is obtained a mixture of isomeric dialdehydic products having two more carbon atoms than the starting diene, i.e., 4,9(10)-diformyltetracyclo[6.2.1.1$^{3,6}$.0$^{2,7}$]dodecanes.

What is claimed is:
1. A process which comprises contacting (1) polycyclic non-conjugated diolefinic compounds of the group consisting of dicyclopentadiene,
bicyclo[2.2.1]-hepta-2,5-diene,
tricyclo[6.2.1.0$^{2,7}$]undeca-4,9-diene,
tetracyclo[6.2.1.1$^{3,6}$.0$^{2,7}$]dodeca-4,9-diene,
pentacyclo[8.2.1.1$^{4,7}$.0$^{2,9}$.0$^{3,8}$]tetradeca-5,11-diene,
pentacyclo[6.6.1.1$^{3,6}$.0$^{2,7}$.0$^{9,14}$]hexadeca-2,11-diene,
methyltricyclo[5.2.1.0$^{2,6}$]deca-3,8-diene,
2-methylbicyclo[2.2.1]hepta-2,5-diene,
2-ethylbicyclo[2.2.1]hepta-2,5-diene,
2-isopropylbicyclo[2.2.1]hepta-2,5-diene,
2-n-butylbicyclo[2.2.1]hepta-2,5-diene,
4-ethyltricyclo[6.2.1.0$^{2,7}$]undec-4,9-diene,
3-methyltricyclo[6.2.1.0$^{2,7}$]undec-4,9-diene,
methyltetracyclo[6.2.1.1$^{3,6}$.0$^{2,7}$]dodeca-4,9-diene, and
methylpentacyclo[6.6.1.1$^{3,6}$.0$^{2,7}$.0$^{9,14}$]hexadeca-2,11-diene;

(2) carbon monoxide; (3) hydrogen; (4) a catalytic quantity of a complex catalyst consisting essentially of rhodium in complex combination with carbon monoxide and triphenylphosphine, the concentration of said triphenylphosphine being at least two equivalents per mole of rhodium; and (5) excess triphenylphosphine; (6) at a temperature in the range of from about 60° C. to 140° C.; (7) at a pressure in the range of from about 10 atmospheres to about 200 atmospheres; and (8) for a period of time sufficient to dihydroformylate said polycyclic non-conjugated diolefinic compounds thereby producing polycyclic dialdehydic products which have two more carbon atoms than said diolefinic compound.

2. The process of claim 1 wherein there is employed from about 2 to about 30 equivalents of triphenylphosphine per mole of rhodium.

3. The process of claim 2 wherein there is employed from about 2 to about 10 equivalents of triphenylphosphine per mole of rhodium.

4. The process of claim 2 wherein the temperature is in the range of from about 65° C. to 95° C.

5. The process of claim 4 wherein said polycyclic diolefinic compound is bicyclo[2.2.1]hepta-2,5-diene.

6. The process of claim 4 wherein said polycyclic diolefinic compound is pentacyclo[8.2.1.1$^{4,7}$.0$^{2,9}$.0$^{3,8}$]tetradeca-5,11-diene.

7. The process of claim 1 wherein said complex catalyst has the empirical formula:

$$(\phi_3 P)_a Rh(CO)_b$$

wherein $\phi$ is phenyl; wherein $a$ and $b$ are integers each having a value of at least one; and wherein the sum of $a$ plus $b$ represents 4.

References Cited

UNITED STATES PATENTS

| 3,102,899 | 9/1963 | Cannell. |
| 3,168,553 | 2/1965 | Slaugh. |
| 3,239,566 | 3/1966 | Slaugh et al. |

BERNARD HELFIN, Primary Examiner

U.S. Cl. X.R.

252—428, 429